United States Patent [19]
Wang et al.

[11] 4,406,720
[45] Sep. 27, 1983

[54] ULTRASONIC PRODUCTION OF NONWOVENS

[75] Inventors: Kenneth Y. Wang, Greensboro, N.C.; Berlie R. Hill, Cana, Va.

[73] Assignee: Burlington Industries, Inc., Greensboro, N.C.

[21] Appl. No.: 318,799

[22] Filed: Nov. 6, 1981

[51] Int. Cl.³ .................. B29C 27/08; B32B 31/20
[52] U.S. Cl. .................... 156/73.2; 156/181; 156/296; 156/553; 156/580.1; 156/580.2; 156/582; 264/23; 425/174.2; 428/296
[58] Field of Search ............... 156/73.1, 73.2, 181, 156/296, 553, 555, 580.1, 580.2, 582, 62.2; 264/23; 228/1 R, 1 B; 425/174.2; 428/198, 296

[56] References Cited
U.S. PATENT DOCUMENTS

| 3,575,752 | 5/1968 | Carpenter | 156/73.2 |
| 3,855,045 | 12/1974 | Brock | 428/198 |
| 3,993,532 | 11/1976 | McDonald et al. | 156/73.1 |
| 4,090,897 | 5/1978 | Minick | 156/73.1 |
| 4,105,491 | 8/1978 | Haase et al. | 156/582 |
| 4,109,353 | 8/1978 | Mitchell et al. | 28/104 |
| 4,110,152 | 8/1978 | Dunning et al. | 156/582 |
| 4,259,399 | 3/1981 | Hill | 428/288 |

*Primary Examiner*—Michael G. Wityshyn
*Attorney, Agent, or Firm*—Cushman, Darby & Cushman

[57] ABSTRACT

An ultrasonically bonded non-woven web is produced having no unacceptable fuzziness. An ultrasonic horn and an anvil roller are mounted for cooperation with each other to effect ultrasonic welding of a single batt of random, loose ultrasonically fusible fibers passed between them in a dry condition. The anvil roller comprises metal projections disposed in a pattern defining the roller circumferential surface, and ultrasonically insulating material—such as rubber—fills the volume between the metal projections.

13 Claims, 5 Drawing Figures

ULTRASONIC PRODUCTION OF NONWOVENS

BACKGROUND AND SUMMARY OF THE INVENTION

In the production of non-woven fabrics by the ultrasonic bonding of a random fiber web utilizing an engraved anvil roll, the fabric produced sometimes has an undesirable amount of "fuzziness" on the back surface thereof (the surface facing the anvil roller). According to the present invention, it has been determined that this fuzziness is a result of fibers tending to fill in the valleys of the engraved roller, and if welding of these fibers takes place when extending into the engraved portions of the roller, the fibers will remain projecting outwardly from the fabric. Such a fuzziness limits the acceptability of the non-woven fabric for certain end uses.

According to the present invention, an anvil roller is provided for the production of non-woven fabric by ultrasonic bonding that overcomes the "fuzziness" problem. The fabric produced according to the invention—in addition to having improved acceptability due to the smoothness of the back surface thereof—also has improved strength properties since secondary welding occurs at crossover points between fibers in the web, providing a plurality of "tack" welds between the main welds. Such tack welds provide improved strength while the back surface of the web is maintained relatively flat, and free of "fuzz".

Exemplary ultrasonic welding apparatus according to the invention includes a conventional ultrasonic horn (which may be of the type disclosed in copending application Ser. No. 145,833 filed May 1, 1980 now U.S. Pat. No. 4,311,540, the disclosure of which is hereby incorporated by reference herein), with an anvil roller mounted for cooperation with the ultrasonic horn to effect ultrasonic welding of material disposed therebetween. The anvil roller has a plurality of spaced radially extending projections formed along the entire circumferential surface thereof. The projections are formed of ultrasonically conducting material (e.g. metal), as is conventional, and provide relatively high compression of the material. According to the present invention, a surface-defining material is provided between the projections, the surface-defining material consisting of ultrasonically insulating material, which provides partial fiber compression. Typical ultrasonically insulating material that is utilizable for practicing the invention includes rubber, polytetrafluoroethylene, and Mylar.

The anvil roller may comprise an engraved roller, engravings defining the volume between the projections, and the surface-defining material comprises a layer of non-metallic material substantially filling the volume between the projections with only short tip portions of the projections extending above the surface-defining material. Alternatively, the anvil roller may comprise a metal roller with the projections comprising metal pins penetrating the roller surface and upstanding therefrom, and defining a volume therebetween. The surface-defining material then comprises a layer of non-metallic material filling the volume between the pins to provide partial fiber compression, with only short tip portions of the pins extending above the surface-defining material. In each case, the distance the tips of the projections extend above the non-metallic layer may be in the range from an infinitesimal amount to a substantial portion of the length of the projections, depending upon the nature of the web, horn, etcetera. Any relative position of parts that achieves the desirable results according to the invention may be provided.

An exemplary anvil roller according to the present invention presents as the exterior surface thereof interspersed ultrasonically conducting material and ultrasonically insulating material. Preferably a regular pattern is provided for the ultrasonically conducting material, with the reset of the roller peripheral surface comprising the ultrasonically insulating material.

In the practice of a method according to the present invention, a single web (batt) of material is fed between an ultrasonic horn and an anvil roller. Sonic energy is continuously applied by the horn to the web as it passes between the horn and roller. The non-woven fabric produced from the batt of thermoplastic fibers passed between the horn and anvil has spaced primary welds corresponding to the metallic surface portions of the roller where fiber compression is relatively high, and additionally has tack welds (which may be referred to as "secondary" welds) at crossover points of fibers between the primary welds. These tack welds are caused by a softening of the thermoplastic fibers due to the initial passage of sonic energy through the batt, with partial compression of the fibers being provided in that area. Such tack welding between the primary welds increases the strength of the fabric produced, while the fuzziness often inherent in the prior art is eliminated. Additionally, it is possible to manufacture lighter weight batts into bonded fabrics by practicing the invention.

It is the primary object of the present invention to provide a more widely acceptable ultrasonically bonded non-woven fabric. This and other objects of the invention will become clear from an inspection of the detailed description of the invention, and from the appended claims.

DETAILED DESCRIPTION OF THE DRAWINGS

Figure 1:
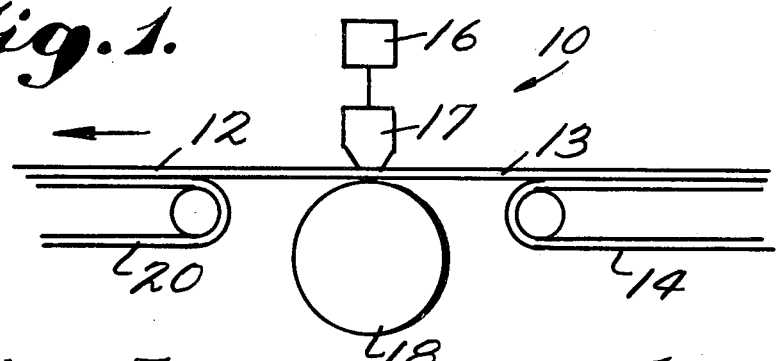
FIG. 1 is a schematic side view illustrating exemplary apparatus according to the present invention in use in the production of an ultrasonically bonded non-woven fabric.

Exemplary apparatus according to the present invention is illustrated generally by reference numeral 10 in FIG. 1. The apparatus 10 is utilized for the production of an ultrasonically bonded non-woven fabric 12 from a single web of material which comprises a batt of random, loose, thermoplastic (i.e. ultrasonically fusible) fibers 13. Typically the batt 13 is conveyed by a conveyor 14 or the like to the ultrasonic welding machine comprising the power source 16, horn 17, and roller 18, and the formed fabric 12 is then conveyed away from the ultrasonic welding apparatus by conveyor 20 or the like. The power source 16 and horn 17 may be selected from a wide variety of commercially available ultrasonic welding machines. The power supply 16 can be a conventional power supply such as one available from Cavitron, Inc., and the horn 17 may comprise a horn such as illustrated in FIGS. 5 through 8 of copending application Ser. No. 145,822 filed May 1, 1980, now U.S. Pat. No. 4,321,789 (the disclosure of which is hereby incorporated by reference herein). The anvil roller 18 may also be of the type illustrated in said copending application Ser. No. 145,833, except that it is modified to include non-metallic surface portions as well as metallic surface portions.

Figure 2:
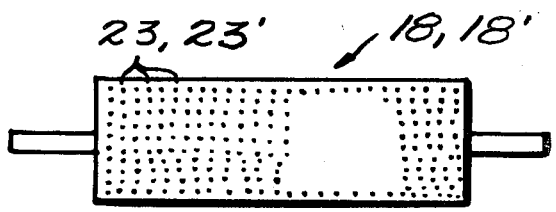
FIG. 2 is a frontal view of an exemplary patterned anvil roll utilizable in the practice of the invention.
Figure 3:
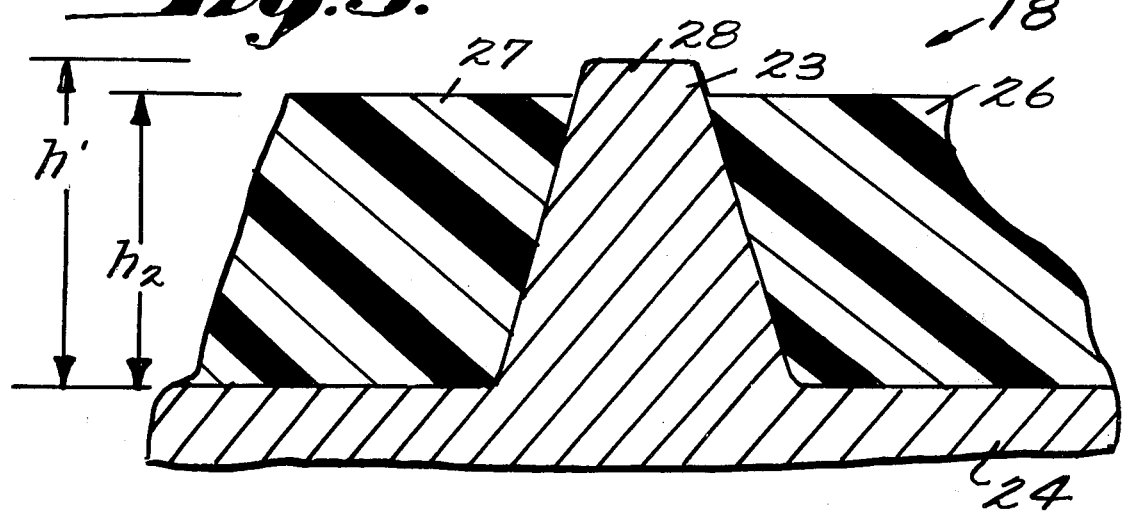
FIG. 3 is a cross-sectional detail view of an exemplary anvil according to the invention illustrating the construction of portions thereof defining and adjacent the roller external peripheral surface.

Frontal and detailed views of an exemplary roller 18 for practicing the present invention are provided by FIGS. 2 and 3. The roller 18 includes a plurality of spaced radially extending projections 23 formed along the entire circumferential surface thereof. Preferably the projections 23 are disposed in a regular pattern as illustrated in FIG. 2, and as more fully described in said application Ser. No. 145,833. In FIG. 3 the roller 18 is illustrated as having the projections 23 formed by engraving a metal roller 24, engravings forming a volume between the projections 23. According to the present invention, ultrasonically insulating material 26 is disposed in the volume between the projections 23. Preferably, the material 26 defines a substantially flat surface 27 based a distance $h_2$ from the roller body 24, with the tip portions 28 of the projections 23 extending a distance $h_1$ so that only short tip portions of the projections 23 extend above the surface 27, the surface 27 providing for partial compression of the fiber in the batt upon which it acts. The relationship between the dimensions $h_1$, $h_2$ may be any relationship that allows the production of non-woven ultrasonically bonded fabrics without unacceptable "fuzziness", and preferably one that results in appropriate tack welding at fiber crossover points between primary welds. Typical sonic wave reflecting materials 26 that may be utilized comprise rubber, Mylar, and polytetrafluoroethylene. Such materials 26 may be heated so that they are flowable, and then poured into the engravings volume, solidifying to provide the structure illustrated in FIG. 3.

Figure 4:
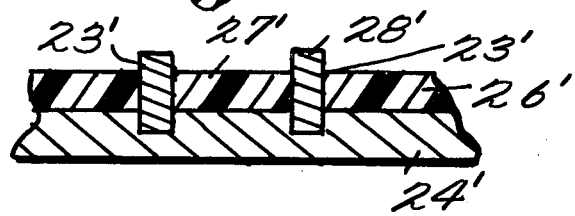
FIG. 4 is a view like that of FIG. 3 for another embodiment of an anvil roller according to the invention.

An alternative construction of an anvil roller according to the present invention is illustrated in FIG. 4. In this figure components corresponding to the embodiment of FIG. 3 are indicated by like reference numerals only followed by a "'". In this embodiment, the roller body 24' also is of metal, with the projections 23' being formed by cylindrical pins penetrating the surface of the roller 24' and extending upwardly therefrom to define tip surfaces 28'. The pins 23' also are preferably disposed in a regular pattern (see FIG. 2). The sonic wave reflecting material 26' fills the volume between the pins 23', with the substantially smooth exterior surface 27' thereof again preferably being provided so that short tip portions 28' of the projections 23' extend thereabove.

While only two different anvil roller constructions have been described herein, a wide variety of other constructions may be provided. According to the invention any anvil roller may be utilized which has an exterior periphery including ultrasonically conducting material and ultrasonically insulating material, providing relatively high and partial fiber compression respectively, and is capable of minimizing fuzziness of the fabric produced, and/or providing tack welds at fiber crossover points. Utilizing an anvil roller (18, 18') according to the present invention, it is possible to produce an ultrasonically bonded non-woven fabric, even from lightweight batts 13, without utilizing a carrier web (as disclosed in U.S. Pat. No. 4,259,399); and while applying the ultrasonic energy—and advancing the web—continuously.

Figure 5:
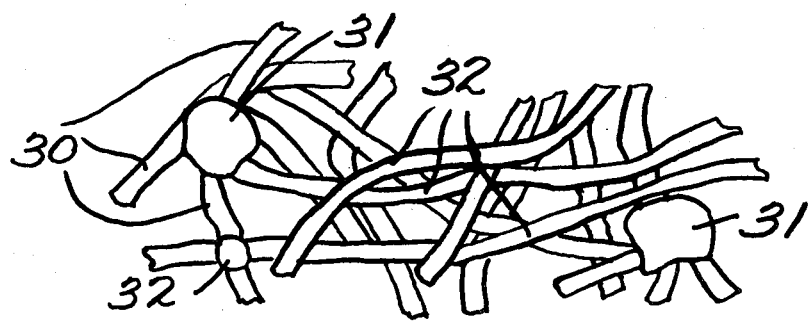
FIG. 5 is an enlarged schematic representation of a portion of an ultrasonically bonded non-woven fabric produced according to the invention.

In FIG. 5 of the drawings a schematic illustration is provided indicating bonding produced when utilizing the apparatus, and practicing the method, according to the invention. The plurality of random ultrasonically fusible fibers 30 forming the batt 13 are acted upon by the horn 17 and anvil roller 18 so that both primary welds 31 and tack welds 32 are provided. The primary welds 31 are provided at the points of engagement of the tips 28, 28' of the projections 23, 23' with the batt (providing relatively high fiber compression). The tack welds 32 are preferably provided at a plurality of crossover points of the fibers 30 between the primary welds 31. The tack welds 32 are produced by the sonic waves from the horn 17 passing through the batt, while the batt is under partial compression. This back and forth passage of the sonic waves effects softening of the fibers 32, so that they stick together at the crossover points to provide the tack welds 32. The surface of the fabric 12 so produced has acceptable smoothness, no readily apparent "fuzz" extending from the back surface thereof.

In a typical operation according to the present invention, a single web of material—comprising the batt 13 of ultrasonically fusible fibers—is conveyed in a dry condition by conveyor 14 to the ultrasonic welding equipment 16, 17, 18. The batt 13 passes between the horn 17 and anvil roller 18 in a dry condition, and primary welds 31 are effected for the batt 13 fibers 30 where the projection tips 28, 28' engage the batt 13, while tack welds 32 are provided at crossover points of the fibers 30 above the material 26. The sonic energy is supplied continuously, and an acceptable, strong non-woven fabric 12 is produced, and conveyed away by the conveyor 20.

It will thus be seen that according to the present invention a desirable ultrasonically bonded non-woven fabric can be produced. While the invention has been herein shown and described in what is presently conceived to be the most practical and preferred embodiment thereof, it will be apparent to those of ordinary skill in the art that many modifications may be made thereof within the scope of the invention, which scope is to accorded the broadest interpretaton of the appended claims so as to encompass all equivalent structure, products, and methods.

What is claimed is:

1. Ultrasonic welding apparatus comprising:
   an ultrasonic horn;
   an anvil roller mounted for cooperation with said ultrasonic horn to effect ultrasonic welding of material disposed therebetween; and
   said anvil roller having: a plurality of spaced radially extending projections formed along the entire circumferential surface thereof, said projections, comprising ultrasonically conducting material; and a surface-defining material provided between said projections said surface-defining material consisting of ultrasonically insulating material.

2. Apparatus as recited in claim 1 wherein said anvil roller projections are made of metal and wherein said surface-defining material is a non-metal.

3. Apparatus as recited in claim 1 wherein said anvil roller comprises a metal roller with said projections comprising metal pins penetrating the roller surface and upstanding therefrom and defining a volume therebetween; and wherein the surface-defining material comprises a layer of non-metallic material substantially filling the volume between said pins with only short tip portions of said pins extending above said surface-defining material, said surface-defining material cooperating with said roller to provide partial compression of fibers therebetween.

4. Apparatus as recited i claim 1 wherein said anvil roller is an engraved metal roller, engravings forming the volume between said projections; and wherein said surface-defining material comprises a layer of non-metallic material substantially filling the volume between said projections with only short tip portions of said projections extending above said surface-defining material, said surface-defining material cooperating with said roller to provide partial compression of fibers therebetween.

5. Apparatus as recited in claims 2, 3 or 4 wherein said ultrasonically insulating material is selected from the group consisting essentially of rubber, Mylar, and polytetrafluoroethylene.

6. Ultrasonic welding apparatus comprising: an ultrasonic horn; an anvil roller mounted for cooperation with said ultrasonic horn to effect ultrasonic welding of material disposed therebetween; and said anvil roller having exterior surface means for cooperation with said ultrasonic horn for producing a non-woven fabric with minimal fuzziness and with tack welds at crossover points between ultrasonically fusible fibers passing between said horn and said anvil roller, said anvil roller surface means comprising interspersed ultrasonically conducting material and ultrasonically insulating material, providing relatively high, and partial, fiber compression, respectively.

7. Apparatus as recited in claim 6 wherein said ultrasonically conducting material is disposed in a regular pattern.

8. Apparatus as recited in claims 6 or 7 wherein said ultrasonically conducting material comprises metal, and wherein said ultrasoncially insulating material is selected from the group consisting essentially of rubber, Mylar, and polytetrafluoroethylene.

9. Apparatus as recited in claim 8 wherein said anvil roller is metal and wherein said metal surface portions thereof comprise metal projection tips extending from said metal roller; and wherein said ultrasonically insulating material substantially fills the volume between said projections with only short tip portions of said projections extending above said ultrasonically insulating material.

10. Apparatus as recited in claim 6 wherein said anvil roller surface means includes substantially smooth ultrasonically conducting material portions and substantially smooth ultrasonically insulating material portions, the ultrasonically conducting material portions being slightly raised with respect to the ultrasonically insulating material portions.

11. A method of producing a non-woven fabric from a batt of random, loose, ultrasonically fusible fibers utilizing an ultrasonic welding machine having a horn and anvil roller, the method consisting of the steps of: (a) continuously feeding, in a given direction, solely the batt between the horn and the anvil roller; and (b) continuously applying ultrasonic energy to the batt with the horn and anvil roller to produce primary welds in a predetermined pattern in the batt and tack welds at fabric crossover points between the primary welds; and (c) withdrawing a substantially smooth-surface non-woven fabric from between the horn and anvil roller.

12. A method as recited in claim 11 wherein step (b) is accomplished by providing an anvil roller having an external peripheral surface comprising a pattern of spaced ultrasonically conducting material tips, and ultrasonically insulating material disposed between the ultrasonically conducting material tips.

13. A method as recited in claim 11 wherein steps (a)-(c) are practiced with the web in a dry condition.

* * * * *